Jan. 10, 1961 R. J. ALMINANA 2,967,454
DARK ROOM CAMERA
Filed Aug. 24, 1953 3 Sheets-Sheet 1

INVENTOR.
Robert J. Alminana
BY
ATTORNEY.

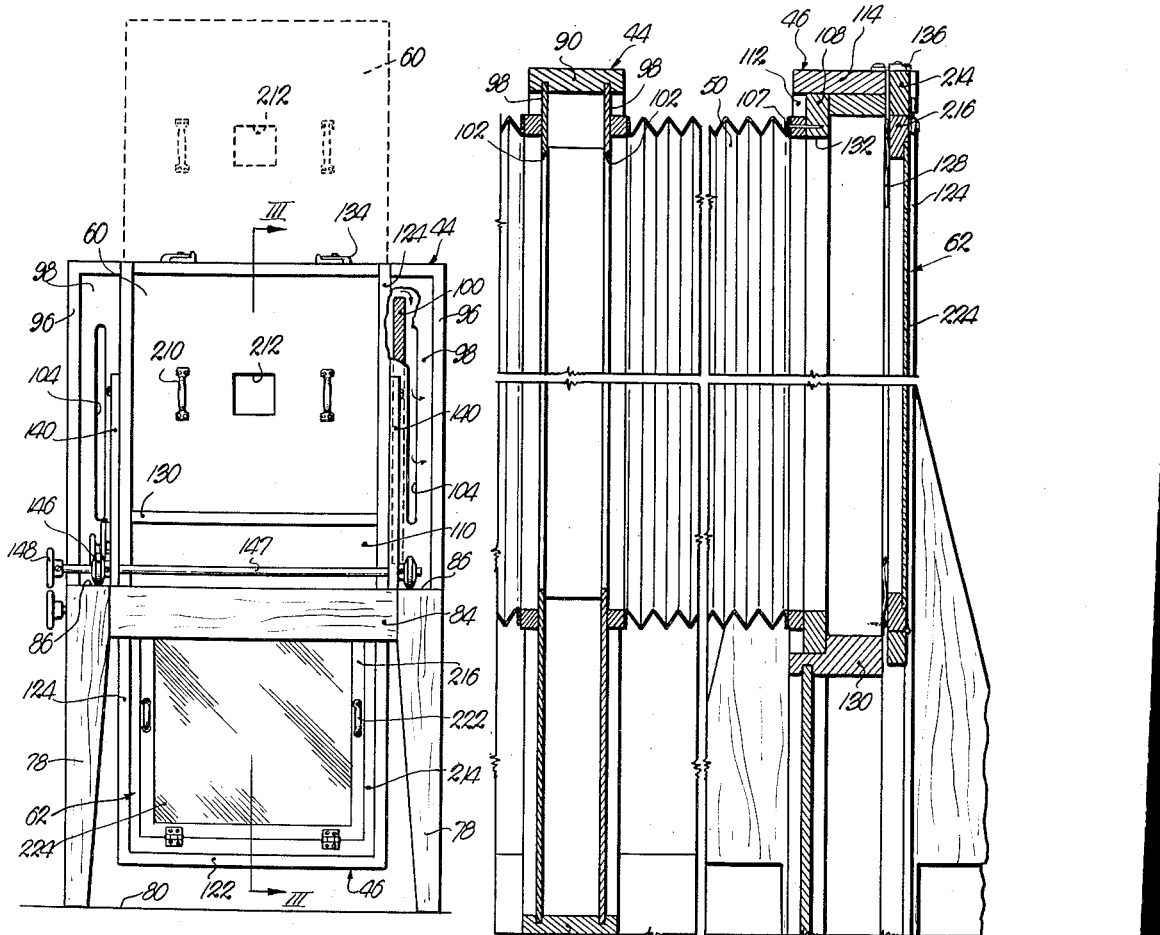
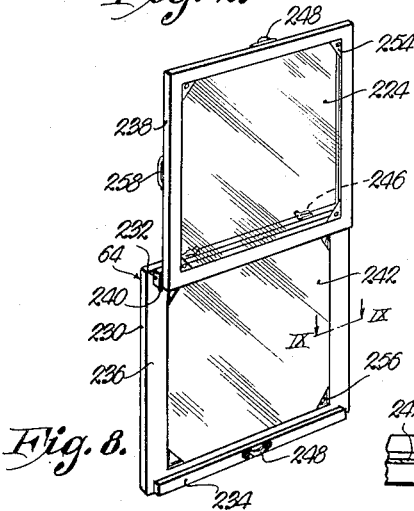
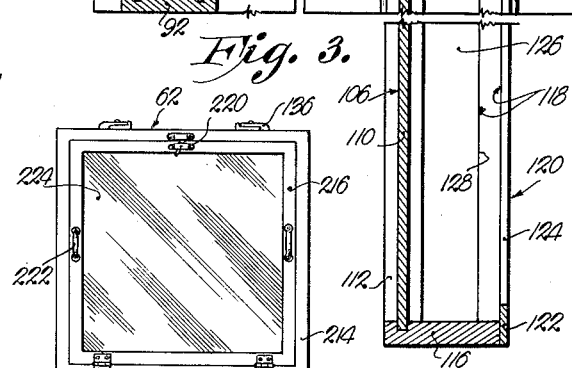

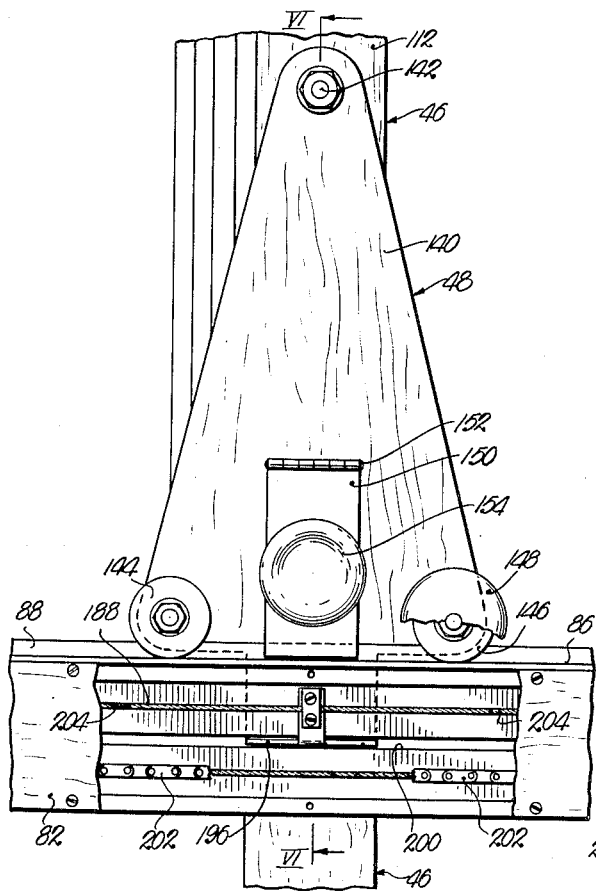
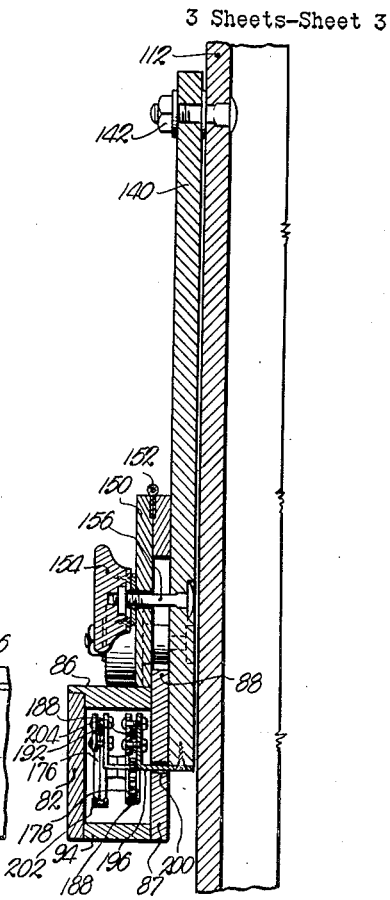
Fig. 5. Fig. 6.
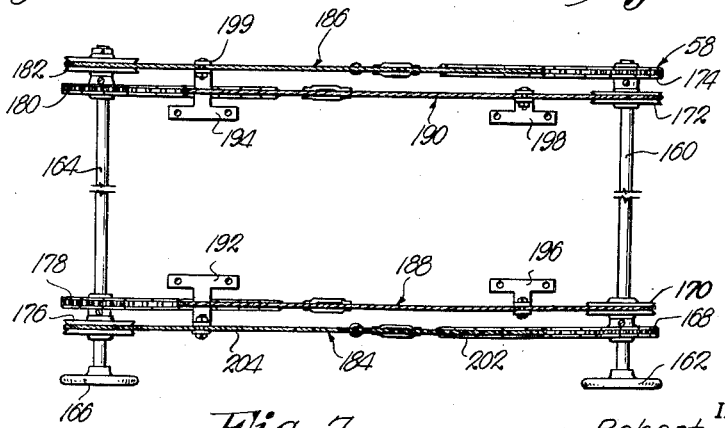
Fig. 7.
INVENTOR.
Robert J. Alminana
BY
ATTORNEY.

United States Patent Office 2,967,454
Patented Jan. 10, 1961

2,967,454

DARK ROOM CAMERA

Robert J. Alminana, 5542 Chestnut St., Kansas City, Mo.

Filed Aug. 24, 1953, Ser. No. 375,997

3 Claims. (Cl. 88—24)

This invention relates, generally, to the field of cameras and, more particularly, to an improved type of camera, which may be termed a "dark room camera," for use in reproducing various types of opaque or partially transparent copy at the same size or at predetermined scales of reduction on enlargement. The dark room camera of this invention is especially useful in copying relatively large subjects or in enlarging subjects to a relatively large size in a single operation.

One important object of this invention is to provide a camera adapted for disposition in through-extending relationship to a wall of a dark room, whereby sensitized photographic film materials may be exposed by means of such camera without removal of such materials from the dark room to a lighted room or area on the opposite side of the wall.

Another important object of this invention is to provide such a camera having structure including rear and front frame assemblies for presenting at the dark room end of the camera either lens holding means, film holding means, ground glass image viewing means or an unimpeded opening, and for presenting at the opposite or lighted room end thereof either lens holding means, negative or translucent copy holding means or an unimpeded opening.

Another important object of this invention is to provide such a camera having a rear frame assembly within the dark room and a front frame assembly outside the dark room, wherein such assemblies are interconnected by means including bellows and are reciprocable relative to each other and to the wall of the dark room disposed between them.

Another important object of this invention is to provide such a camera having improved means for manually controlling reciprocation of both the rear frame assembly or the front frame assembly from within either the dark room or the lighted room.

Another important object of this invention is to provide such a camera which is capable of use in effecting copying wherein the size of the reproduction, the size of the subject being reproduced and the scale of enlargement or reduction are limited only by the sizes of the dark room and the lighted room with which the camera is used.

Another important object of this invention is to provide such a camera having a rear frame assembly adapted to slidably receive combination image viewing and film holding means for reciprocation between a stored position and an operative position and to alternately receive movable lens holding means in an operative position when the image viewing and film holding means is in its stored position, and having a front frame assembly adapted to slidably receive negative holding means for reciprocation between a stored position and an operatvie position and to alternatively receive removable lens holding means in an operative position when the negative holding means is in its stored position.

Other important objects of this invention are to provide such a camera including improved means for holding photographic negatives or partially transparent copy and improved, combined film holding and image viewing means.

Still other objects of this invention, including important details of construction, will be made clear or become apparent as the following specification progresses.

Referring now to the accompanying drawings:

Fig. 2 is a rear elevational view of the dark room end of the camera showing the combination film holding and image viewing device of the invention in stored position and the lens holder in operative position, parts being broken away for clarity, a position of the lens holder during removal being indicated in dotted lines;

Fig. 3 is a fragmentary, cross-sectional view, essentially taken along line III—III of Fig. 2, but showing the film holding and image viewing device in operative position with the lens holder removed;

Fig. 4 is an elevational view of the film holding and image viewing device taken from the normally rear or access side thereof;

Fig. 5 is a fragmentary, side elevational view of the rear frame assembly carrier, a portion of one track member and a portion of the associated frame moving mechanism, parts being broken away for clarity;

Fig. 6 is a fragmentary, cross-sectional view taken on line VI—VI of Fig. 5;

Fig. 7 is a top plan view of the frame moving mechanism per se, parts being broken away for clarity;

Fig. 8 is a perspective view of the negative holder of this invention; and

Fig. 9 is a fragmentary, cross-sectional view taken on line IX—IX of Fig. 8.

Figure 1:
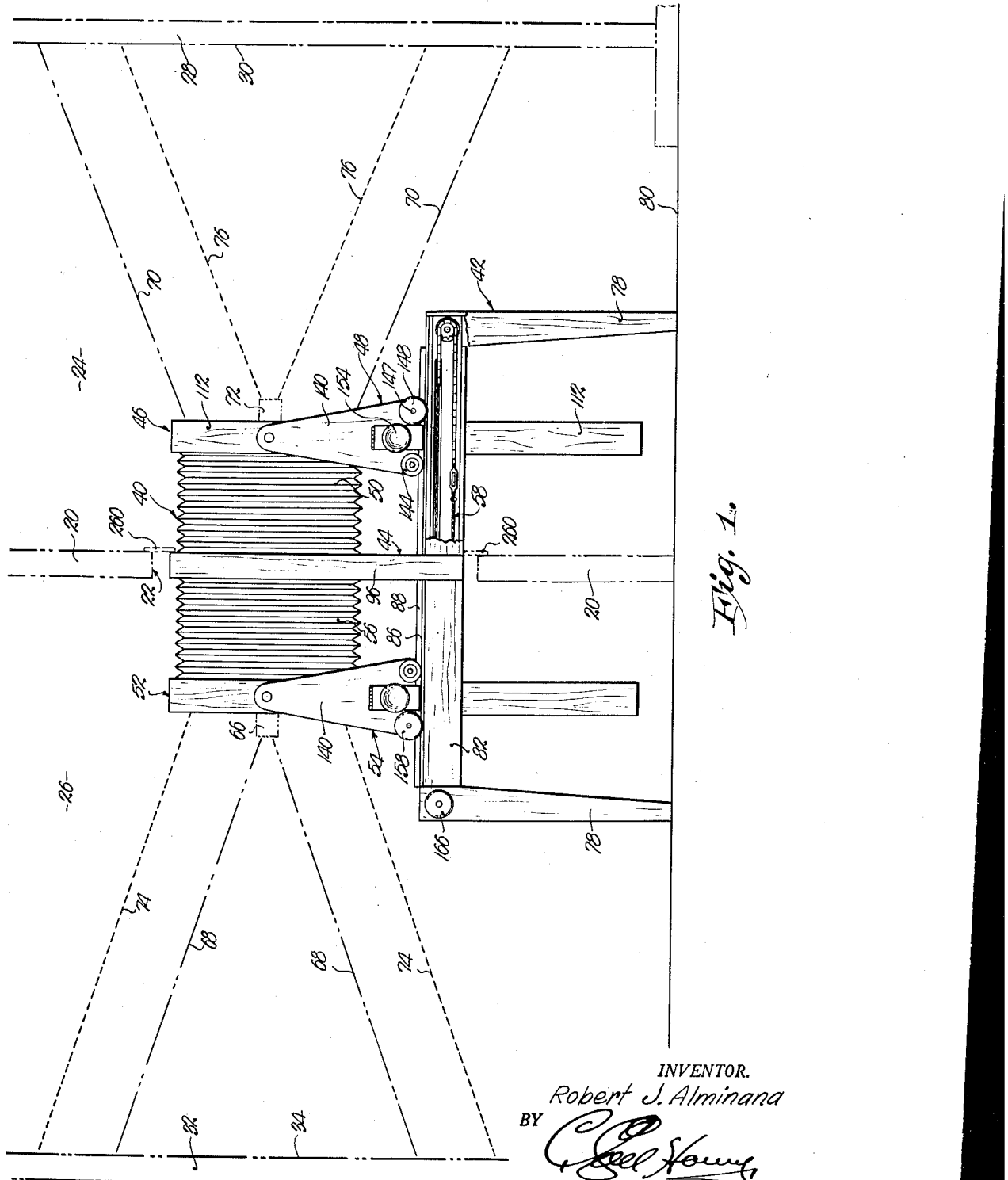
Figure 1 is a side elevational view of the camera of this invention, parts being broken away for clarity, certain structure with which the camera may be associated in operation being indicated in dotted lines.

With particular reference first to Fig. 1, the numeral 20 generally indicates a wall having an opening 22 therethrough. A photographic dark room 24 is disposed to the right of wall 20 in the figure and separated by wall 20 from a lighted area or room 26. Dark room 24 is preferably provided with an easel 28, conventionally formed partly of ground glass for image viewing and which is adapted for holding film or the like and is movably supported with its film receiving face 30 facing wall 20 in alignment with opening 22 for reciprocation toward and away therefrom. Similarly, lighted room 26 is preferably provided with a copy board 32, which is adapted for holding copy or the like and is movably supported with its copy receiving face 34 facing wall 20 in alignment with opening 22 for reciprocation toward and away therefrom, face 30 of easel 28 and face 34 of copy board 32 being normally maintained in parallelism at all times.

The numeral 40 generally indicates the dark room camera of this invention, which broadly includes an elongated, open-topped table or support 42; a central frame assembly 44 rigidly mounted in upstanding relationship upon support 42 intermediate the ends of the latter; a rear frame assembly 46; a rear frame assembly carrier 48 movably mounting rear frame assembly 46 upon support 42 for reciprocable movement toward and away from central frame assembly 44; a hollow, rear bellows 50 interconnecting assembly 46 and assembly 44; a front frame assembly 52; a front frame assembly carrier 54 movably mounting front frame assembly 52 upon support 42 for reciprocable movement toward and away from central frame assembly 44; a hollow, front bellows 56 interconnecting assembly 52 and assembly 44; mechanism 58 for controllably moving carriers 48 and 54; and interchangeably removable structures including a lens holder 60 (Fig. 2), a combination film holding and image viewing device 62 (Figs. 3 and 4), and a negative holder 64 (Figs. 8 and 9).

In Fig. 1, the numeral 66 indicates the position of a lens mounted on lens holder 60 when the latter is in operative position on front frame assembly 52, dotted lines 68 indicating the path of light from a subject to be copied (not shown) held on face 34 of copy board 32 to lens 66, and dotted lines 70 roughly indicating the path of light from lens 66 to a film (not shown) held on face 30 of easel 28 when the device 62 is not in operative position on the rear frame assembly 46. As will hereinafter become more clear, device 62 may be used instead of easel 28 in certain circumstances to hold the film (not shown). Similarly, the numeral 72 indicates the position of a lens mounted on lens holder 60 when the latter is in operative position on rear frame assembly 46, dotted lines 74 roughly indicating the path of light from a subject to be copied (not shown) held on face 34 of copy board 32 to lens 66 when the negative holder 64 is not in operative position on the front frame assembly 52, and dotted lines 76 indicating the path of light from lens 66 to a film (not shown) held on face 30 of easel 28. Likewise, it will later become more clear that negative holder 64 may be used instead of copy board 32 in certain circumstances to hold the subject to be copied (not shown) particularly where such subject is a relatively small photographic negative or other partially transparent copy.

As will be clear from Figs. 1, 2, 5, and 6, support 42 includes two spaced pairs of spaced legs 78 for engaging a floor 80, legs 78 preferably being each provided with any suitable levelling means (not shown); a pair of elongated, spaced, parallel, hollow track members 82 each interconnecting a pair of legs 78 longitudinally of support 42; and a pair of elongated, spaced, parallel, hollow, shaft housing elements 84 communicating with members 82 and each interconnecting a pair of legs 78 transversely of support 42. The members 82 and the elements 84 are all disposed longitudinally horizontally and in substantially coplanar relationship with the space therebetween open to clear assemblies 44, 46 and 52. Each member 82 is provided with a flat, horizontal, uppermost track surface 86 and with an upstanding flange 88 along the innermost, longitudinal edge of its track surface 86.

Central frame assembly 44, as best seen in Figs. 1, 2 and 3, includes an elongated, horizontal top wall 90 having its longitudinal axis disposed transversely of support 42 and a substantial distance thereabove; an elongated bottom wall 92 parallel to and below top wall 90 and preferably substantially flush with the lowermost faces 94 of members 82; a pair of spaced side walls 96; front and rear walls 98; and a pair of light baffles 100. Front and rear walls 98 are each provided with a rectangular, camera chamber opening 102 and with a pair of air vent slots 104 disposed to the sides of opening 102. Baffles 100 interconnect the front and rear walls 98 between openings 102 and slots 104 of the latter and extend beyond the upper and lower extremities of slots 104 to permit the escape through slots 104, as indicated by the arrows in Fig. 2, of air compressed by closure of bellows 50 and 56, without permitting the entry of light from slots 104 into the chamber of camera 40 defined by openings 102 and the hollow interiors of bellows 50 and 56. Central frame assembly 44 is rigidly secured to members 82 of support 42 in an upstanding position about midway between the ends of support 42, as shown in Fig. 1, by any suitable means (not shown), it being noted that the structure of assembly 44 clears rather than interrupts members 82. Bellows 50 and 56 may be fastened to assembly 44 in any suitable fashion adapted to prevent the passage of light through the connection.

As best shown in Figs. 1, 2 and 3, rear frame assembly 46 is elongated and of width less than the distance between members 82 of support 42, and is disposed in longitudinally upright fashion between members 82 with its width transverse to support 42 and its length extending above and below members 82. Assembly 46 includes a rectangular front wall 106 having an upper section 108 to which bellows 50 is attached as at 107 and a lower section 110; a pair of side walls 112; a top wall 114; a bottom wall 116; and a rearward, vertical track 118 adapted to slidably receive either or both of device 62 and lens holder 60 one above the other. Track 118 is presented between a U-shaped, open-topped, frame 120 having a horizontal bight 122 and a pair of spaced, vertical guide legs 124 extending upwardly from bight 122 throughout the entire length of the assembly 46, and side inserts 126 secured to the inner faces of side walls 112 and extending substantially the length of the latter, the rearmost edges 128 of inserts 126 being spaced from legs 124 to form the track 118. A light baffle piece 130 extends between side walls 112 adjacent the junction of sections 108 and 110. Upper section 108 of front wall 106 is provided with a camera chamber opening 132 in alignment with, but of slightly greater dimensions than, openings 102 in walls 98 of the central frame assembly 44.

In Fig. 2, lens holder 60 is removably held in operative position in track 118 of rear frame assembly 46 and in alignment with opening 132 by cooperative latch means 134 on the holder 60 and top wall 114 of assembly 46, while device 62 is shown in its stored position in the lower portion of track 118. In Fig. 3, the lens holder 60 has been lifted and removed from assembly 46 and device 62 has been slid upwardly in track 118 into its operative position in alignment with opening 132, where it is latched to top wall 114 by means 136. Springs 138 are provided on face 128 of inserts 126 for holding the lens holder 60 or the device 62 against shifting in track 118 while in the operative position.

It is to be understood that the front frame assembly 52 may be of construction identical to that of rear frame assembly 46 for slidably receiving either or both of negative holder 64 and lens holder 60 in fashion corresponding to that in which device 62 and lens holder 60 are respectively accommodated by rear frame assembly 46. Obviously, either or both of assemblies 46 and 52 could be constructed with their tracks 118 adapted to receive only one of structures 60, 62 and 64 at a time, that is, to receive a structure 60, 62 or 64 only in an operative position aligned with openings 102 and 132 and with no provision for storage in the camera 40 of structures 62 or 64 when not in their operative position; however, the advantages of the preferred construction described will be apparent.

The rear frame assembly carrier 48 and the front frame assembly carrier 54 are substantially identical, so that only one of them need be described in detail. Referring to Figs. 1, 2, 5 and 6, rear carrier 48 includes a pair of arrowhead-shaped plates 140 adjustably secured to opposite side walls 112 of assembly 46 as at 142, it being noted that assembly 46 may be further weighted at its lower extremity for additional stability, if desired. A pair of rollers 144 and 146 are rotatably mounted on each plate 140, as best shown in Figs. 2 and 5, rollers 144 and 146 being disposed in rolling engagement with the uppermost track surfaces 86 of a corresponding member 82. A manually operable knob 148 is coaxially and corotationally mounted with the rollers 146 on a shaft 147 for use in adjusting the position of carrier 48 from within dark room 24. Knobs 148 could be provided at both ends of shaft 147, if desired. At least one of plates 140 is also provided with locking means consisting of an element 150 hingedly attached to the plate 140 as at 152 and adapted to clamp against flange 88 of member 82 when element 150 is swung toward plate 140 by tightening of a knobbed nut 154 upon a bolt 156 anchored to plate 140. It will be apparent that the front carrier 54 includes a knob 158 for use in adjusting the position of carrier 54 and assembly 52 from within the lighted room, when such is desirable.

Referring now to Figs. 1, 5, 6 and 7, the remote driving mechanism 58 for frame carriers 48 and 54 includes a rear shaft 160 rotatably mounted adjacent the rear end of support 42 within rear element 84, extending into both members 82, and having a knob 162 rigidly mounted thereon externally of support 42; a front shaft 164 similarly mounted at the front of support 42 and provided with a knob 166; a sprocket wheel 168 rigidly mounted and a pulley rotatably mounted on shaft 160 in alignment with the member 82 visible in Fig. 1; a pulley 172 rotatably mounted and a sprocket wheel 174 rigidly mounted on shaft 160 in alignment with the member 82 not visible in Fig. 1; a pulley 176 in alignment with sprocket 168, a sprocket wheel 178 in alignment with pulley 170, a sprocket wheel 180 in alignment with pulley 172, and a pulley 182 in alignment with sprocket wheel 174, pulleys 176 and 182 being rotatably mounted on shaft 164 and sprocket wheels 178 and 180 being rigidly mounted on shaft 164; a number of endless lines 184, 186, 188 and 190 respectively interconnecting sprocket wheels 168, 174, 178 and 180 with their respective aligned pulleys 176, 182, 170 and 172; and a number of brackets 192, 194, 196 and 198 respectively rigidly secured to the lowermost extremities of the plate 140 of carrier 54 visible in Fig. 1, the plate 140 of carrier 54 not visible in Fig. 1, the plate 140 of carrier 48 visible in Fig. 1, and the plate 140 of carrier 48 not visible in Fig. 1, brackets 192, 194, 196 and 198 each extending through an elongated, horizontal slot 200 in the inner wall 87 of the corresponding member 82 and being respectively adjustably attached by suitable means 199 to lines 184, 186, 188 and 190. From the foregoing, it will be seen that front carrier 54 may be positioned from within dark room 24 by manipulation of knob 162, and that rear carrier 48 may be moved from within lighted room 26 by manipulation of knob 166 when desired. Each of lines 184, 186, 188 and 190 is preferably formed of a length of sprocket chain 202 suitably interconnected with a length of steel cable 204.

As shown in Fig. 2, lens holder 60 is rectangular, plate-like and of dimensions adapted to be slidably received by the track 118 of assembly 46 or assembly 52. Holder 60 is provided with handles 210 and with a centrally disposed lens receiving opening 212 in which any conventional copying lens (not shown) may be mounted in any suitable fashion.

Referring to Figs. 3 and 4, the combination film holding and image viewing device 62 includes a rectangular, centrally open outer frame 214 adapted to be slidably received in track 118 of assembly 46 and provided with latching means 136 for securing device 62 in an operative position; a rectangular, centrally open inner frame 216 hingedly mounted to the outer frame 214 as at 218 for swinging movement toward and away from a position within frame 214, where it may be latched by means of a lock 220. Inner frame 216 is provided with handles 222 and carries a piece of ground glass 224 which may be alternately used for viewing an image during focusing and adjustment of camera 40 and for supporting a piece of film attached thereto by Scotch tape or any other suitable means (not shown) during exposure.

The negative holder 64, as shown in Figs. 8 and 9, includes a main, rectangular, centrally open frame 230 adapted to be received in track 118 of assembly 52; a pair of elongated blocks 232 and 234 secured to frame 230 respectively at the top and bottom of the normally front or access face 236 of frame 230; an auxilliary rectangular, centrally open frame 238 of lesser dimensions than frame 230 and hingedly attached to block 232 as at 240 for swinging movement toward and away from a position disposing frame 238 between blocks 232 and 234 and in superimposed relationship to frame 230; and a pair of clear glass plates 242 and 244 respectively mounted upon frames 230 and 238 in a manner such that they will be tightly pressed together when frame 238 is swung to its negative holding position between blocks 232 and 234. Frame 230 is provided with latch means 246 for holding negative holder 64 in an operative position in assembly 52, and latch means 248 are provided on block 234 and frame 238 for holding plate 244 pressed against plate 242 and a photographic negative (not shown) between plates 242 and 244 when frame 238 is swung between blocks 232 and 234. Frame 230 is inwardly shouldered as at 250 to receive strips 252 of rubber or other resilient material between plate 242 and frame 230. Plate 242 normally protrudes slightly from face 236 of frame 230 until pressed flush therewith by the pressure of plate 244 working against the bias of strips 252 when frame 238 is swung to its negative holding position. Strips 252 and plate 242 may be held against accidental escape from frame 230 by any suitable means such as adhesive (not shown). Frame 238 is shouldered in the same manner as frame 230 and plate 244 is held therein as by metal retainers 254, the corners of plate 242 being cut away as at 256 to clear retainers 254 when plates 242 and 244 are pressed together. Handles 258 are provided on frame 238.

It may be noted that ordinary window lock latches have been found quite satisfactory for use as latching means 134, 136, 246 and 248 and also for lock 220.

To place camera 40 in operative condition, it is emplaced on floor 80 relative to dark room 24 and lighted room 26 as shown in Fig. 1, with the central frame assembly 44 within opening 22 of wall 20. Support 42 is then adjusted and leveled so that the longitudinal axes of track surfaces 86 are horizontal and substantially in parallelism with the paths of reciprocation of easel 28 and copy board 32, and the space within opening 22 around assembly 44 is suitably masked as at 260 to prevent entry of light to room 24 around the camera 40. Brackets 192, 194, 196 and 198 are then adjusted upon lines 184, 186, 188 and 190 so that the paths of travel of carriers 48 and 54 and assemblies 46 and 52 supported thereby will be in alignment with each other and parallel to the paths of reciprocation of easel 28 and copy board 32.

Since, in photographic copying, the distance from the subject to the lens determines the size of the reproduction while the distance from the lens to the film position determines focusing, it is clear that the provision in the camera 40 of this invention for adjustment of both of such distances from within either the dark room 24 or the lighted room 26 presents a dark room camera of greatly improved efficiency over copying cameras heretofore known.

It will also be clear to those skilled in the art that the removability and interchangeability of lens holder 60, film holding and image viewing device 62 and negative holder 64, as well as the provision for storage of device 62 and holder 64 presents a camera 40 of further improved efficiency and capabilities. In fact, it will be obvious to those skilled in this field that the camera 40 of this invention, when used in connection with a conventional easel 28 and copy board 32, is capable of making, in a single operation and without a special lens, enlargements and reductions whose degree is limited only by the size of rooms 24 and 26.

Further, the improved structures of device 62 and negative holder 64, as well as their particular usefulness as a part of the camera 40 of this invention, will be readily appreciated by users of copying cameras.

Manifestly, many minor changes and modifications could be made in this invention without departing from the spirit thereof; accordingly, it is desired that this invention be limited only by the scope of the appended claims.

Having thus described the invention what is claimed as new and desired to be secured by Letters Patent is:

1. In a dark room camera installation adapted for use in alternately making either enlarged, reduced or same size exposures of pieces of either opaque or transparent copy upon pieces of photosensitive film and which includes a wall provided with an opening therethrough, a darkened room on one side of the wall having first means for holding a piece of film therein aligned with the opening, and a lighted room on the opposite side of the wall having means for holding a piece of opaque copy therein aligned with the opening, the combination of: a lens; second means for holding a piece of transparent copy; a first frame in the darkened room aligned with the opening and provided with an aperture adapted for alternately remaining open, operably receiving the lens and operably receiving the second film holding means; a second frame in the lighted room aligned with the opening and provided with an aperture adapted for alternately remaining open, operably receiving a lens and operably receiving the transparent copy receiving means; means mounting the first frame between the wall and the first film holding means and for movement toward and away from the wall in alignment with the opening; means mounting the second frame between the wall and the opaque copy holding means and for movement toward and away from the wall in alignment with the opening; a pair of expansible bellows, corresponding ends of the bellows being adapted to be connected to opposite faces of said wall in alignment with the opening and the opposite ends of the bellows being operably coupled with respective first and second frames in alignment with said apertures therein; means for moving the first frame having control parts in and independently manipulable from each of said rooms; and separate means for moving the second frame independently of the first frame and having control parts in and independently manipulable from each of said rooms.

2. In apparatus as set forth in claim 1 wherein is provided an image viewing screen, and said screen is operably receivable by the aperture of the first frame.

3. In a dark room camera installation adapted for use in alternately making either enlarged, reduced or same size exposures of pieces of either opaque or transparent copy upon pieces of photosensitive film and which includes a wall provided with an opening therethrough, a darkened room on one side of the wall having first means for holding a piece of film therein aligned with the opening, and a lighted room on the opposite side of the wall having means for holding a piece of opaque copy therein aligned with the opening, the combination of: a lens; second means for holding a piece of transparent copy; a first frame in the darkened room aligned with the opening and provided with an aperture adapted for alternately remaining open, operably receiving the lens and operably receiving the second film holding means; a second frame in the lighted room aligned with the opening and provided with an aperture adapted for alternately remaining open, operably receiving the lens and operably receiving a transparent copy receiving means; means mounting the first frame between the wall and the first film holding means and for movement toward and away from the wall in alignment with the opening; means mounting the second frame between the wall and the opaque copy holding means and for movement toward and away from the wall in alignment with the opening; and a pair of expansible bellows, corresponding ends of the bellows being adapted to be connected to opposite faces of said wall in alignment with the opening and the opposite ends of the bellows being operably coupled with respective first and second frames in alignment with said apertures therein.

References Cited in the file of this patent

UNITED STATES PATENTS

| Number | Name | Date |
|---|---|---|
| 547,855 | Lee | Oct. 15, 1895 |
| 1,141,704 | French | June 1, 1915 |
| 1,214,132 | Carleton | Jan. 30, 1917 |
| 1,452,077 | Huebner | Apr. 17, 1923 |
| 1,847,010 | Koppe | Feb. 23, 1932 |
| 1,999,616 | Peterson | Apr. 30, 1935 |
| 2,306,885 | Klemm et al. | Dec. 29, 1942 |
| 2,376,416 | Campbell | May 22, 1945 |
| 2,402,107 | Wekeman | June 11, 1946 |
| 2,441,687 | Crockett | May 18, 1948 |
| 2,458,269 | Huebner | Jan. 4, 1949 |
| 2,497,559 | Rice | Feb. 14, 1950 |